United States Patent
Kondo et al.

(10) Patent No.: US 11,738,720 B2
(45) Date of Patent: Aug. 29, 2023

(54) VEHICLE CLEANER UNIT AND VEHICLE PROVIDED WITH VEHICLE CLEANER UNIT

(71) Applicant: KOITO MANUFACTURING CO., LTD., Tokyo (JP)

(72) Inventors: Masayuki Kondo, Shizuoka (JP); Akinobu Kubota, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 368 days.

(21) Appl. No.: 16/642,487

(22) PCT Filed: Jun. 12, 2018

(86) PCT No.: PCT/JP2018/022370
§ 371 (c)(1),
(2) Date: Feb. 27, 2020

(87) PCT Pub. No.: WO2019/044113
PCT Pub. Date: Jul. 3, 2019

(65) Prior Publication Data
US 2020/0254980 A1    Aug. 13, 2020

(30) Foreign Application Priority Data

Aug. 30, 2017   (JP) ................. 2017-165447
Aug. 30, 2017   (JP) ................. 2017-165449

(51) Int. Cl.
*B60S 1/60*    (2006.01)
*B08B 5/02*    (2006.01)
*B60S 1/54*    (2006.01)

(52) U.S. Cl.
CPC ............ *B60S 1/603* (2013.01); *B08B 5/02* (2013.01); *B60S 1/54* (2013.01)

(58) Field of Classification Search
CPC .... B60S 1/603; B60S 1/54; B60S 1/56; B60S 1/0848; B60S 1/0844; B08B 5/02
(Continued)

(56) References Cited

U.S. PATENT DOCUMENTS

2015/0078940 A1   3/2015   Kikuta et al.
2015/0343999 A1   12/2015  Lopez Galera et al.
(Continued)

FOREIGN PATENT DOCUMENTS

JP    2001171491 A    6/2001
JP     201583830 A    4/2015
(Continued)

OTHER PUBLICATIONS

International Search Report (PCT/ISA/210) dated Sep. 4, 2019, issued by the International Searching Authority in counterpart International Application No. PCT/JP2018/022370.
(Continued)

*Primary Examiner* — Thomas Raymond Rodgers
(74) *Attorney, Agent, or Firm* — Sughrue Mion, PLLC (57) ABSTRACT

This vehicle cleaner unit, for cleaning a to-be-cleaned object mounted on the vehicle, is provided with: a single motor; a single pump comprising a cylinder which extends in a longitudinal direction of the vehicle cleaner unit and into which air is introduced, and a piston which can carry out linear motion in the longitudinal direction inside of the cylinder and which blows air to outside of the vehicle cleaning unit at high pressure; a biasing spring which biases the piston to a first side in the longitudinal direction; and a single worm mechanism which transmits rotary motion of the motor to cause the piston to carry out linear motion to the second side opposite of the first side. The rotation axis of the motor and the longitudinal direction are parallel, and the
(Continued)

motor and the pump are positioned on the same side of the worm mechanism in the longitudinal direction.

8 Claims, 8 Drawing Sheets

(58) Field of Classification Search
USPC .................................... 15/250.01; 417/437
See application file for complete search history.

(56) References Cited

U.S. PATENT DOCUMENTS

| 2017/0313286 | A1 | 11/2017 | Galera et al. |
| 2018/0186342 | A1 | 7/2018 | Kubota et al. |
| 2018/0372078 | A1* | 12/2018 | Kawai ..................... F04B 39/12 |
| 2019/0219043 | A1 | 7/2019 | Kikuta et al. |
| 2019/0375378 | A1* | 12/2019 | Nezu ......................... B08B 5/02 |

FOREIGN PATENT DOCUMENTS

| JP | 2015224032 A | 12/2015 |
| JP | 2018118717 A | 8/2018 |
| WO | 2017002878 A1 | 1/2017 |

OTHER PUBLICATIONS

Written Opinion (PCT/ISA/237) dated Sep. 4, 2019, issued by the International Searching Authority in counterpart International Application No. PCT/JP2018/022370.

* cited by examiner

VEHICLE CLEANER UNIT AND VEHICLE PROVIDED WITH VEHICLE CLEANER UNIT

This is a National Stage Application of Application No. PCT/J P2018/022370 filed Jun. 12, 2018, claiming priority based on Japanese Patent. Application Nos. 2017-165447 and 2017-165449 filed Aug. 30, 2017, the contents of all of which are incorporated herein by reference in their entirety.

TECHNICAL FIELD

The present invention relates to a vehicle cleaner unit configured to clean a to-be-cleaned object and a vehicle provided with a vehicle cleaner unit.

BACKGROUND ART

In recent years, vehicles having a vehicle-mounted camera configured to capture a situation around a vehicle are increasing. A lens, which is an imaging surface, of the vehicle-mounted camera may be smudged due to rain, mud and the like. For this reason, in order to remove foreign matters such as water droplets attached on the lens, a device configured to remove the foreign matters by ejecting a cleaning liquid, compressed air and the like to the lens of the vehicle-mounted camera is known.

For example, PTL 1 discloses a configuration where a compressed air generation unit is provided in the vicinity of the vehicle-mounted camera, and compressed air of the compressed air generation unit is sprayed from a nozzle to eject high-pressure air to a front glass of the vehicle-mounted camera, thereby removing water droplets attached on the front glass (refer to PTL 1).

CITATION LIST

Patent Literature

PTL 1: JP-A-2001-171491

SUMMARY OF INVENTION

Technical Problem

However, for further space saving, there is room for improvement on a layout of cleaner components.

Also, according to the configuration disclosed in PTL 1, the compressed air generation unit and the like are configured separately from the vehicle-mounted camera, so that there is room for improvements on operability upon attachment of the components to the vehicle and space saving.

It is therefore an object of the present invention to provide a vehicle cleaner unit and a vehicle provided with a vehicle cleaner unit capable of implementing space saving by an effective component layout.

Another object of the present invention is to provide a vehicle cleaner unit capable of improving attachment operability and implementing space saving.

Solution to Problem

In order to achieve the above objects, a vehicle cleaner unit of the present invention is a vehicle cleaner unit for cleaning a to-be-cleaned object mounted on a vehicle. The vehicle cleaner unit includes:

a single motor;
a single pump including a cylinder extending in a longitudinal direction of the vehicle cleaner unit, air being introduced into the cylinder, and a piston capable of carrying out linear motion in the longitudinal direction inside of the cylinder and configured to blow the air outside of the vehicle cleaner unit at high pressure;
an urging member configured to urge the piston toward a first side in the longitudinal direction; and
a single worm mechanism configured to transmit rotary motion of the single motor to cause the piston to carry out linear motion to a second side opposite to the first side,
wherein a rotation axis of the single motor and the longitudinal direction are parallel to each other, and
wherein the single motor and the single pump are positioned on the same side of the worm mechanism in the longitudinal direction.

According to the above configuration, it is possible to implement the space saving by the effective component layout.

Also, in the vehicle cleaner unit of the present invention, a circuit board for controlling the single motor may be disposed inside of a housing of the vehicle cleaner unit.

For further space saving, the circuit board for controlling the motor is preferably disposed in the vehicle cleaner unit.

Also, in the vehicle cleaner unit of the present invention, the circuit board may be disposed in the longitudinal direction.

For further space saving, the circuit board for controlling the motor is preferably disposed in the vehicle cleaner unit.

Also, in the vehicle cleaner unit of the present invention, the single motor may be disposed between the circuit board and the cylinder.

For further space saving, the circuit board for controlling the motor is preferably disposed in the vehicle cleaner unit.

Also, in order to achieve the above objects, a vehicle cleaner unit of the present invention is a vehicle cleaner unit for cleaning a to-be-cleaned object mounted on a vehicle. The vehicle cleaner unit includes:

a base member configured to support the to-be-cleaned object;
a high-pressure air generation unit including a pump configured to generate high-pressure air, and a drive source configured to drive the pump; and
a nozzle configured to spray the high-pressure air toward a cleaning surface of the to-be-cleaned object,
wherein a discharge port of the nozzle is provided on a side, which is opposite to a side on which the high-pressure air generation unit, of the base member.

According to the above configuration, it is possible to implement the space saving by the effective component layout.

Also, in the vehicle cleaner unit of the present invention, the nozzle may be integrated with the base member.

According to the above configuration, it is possible to omit an operation of attaching the nozzle to the base member, so that it is possible to improve operation efficiency.

Also, a vehicle provided with a vehicle cleaner unit of the present invention includes the vehicle cleaner unit having any one of the above-described configurations.

According to the above configuration, it is possible to implement the space saving by the effective component layout.

Advantageous Effects of Invention

According to the vehicle cleaner unit and the vehicle provided with a vehicle cleaner unit of the present invention, it is possible to implement the space saving by the effective component layout.

Also, according to the vehicle cleaner unit and the vehicle provided with a vehicle cleaner unit of the present invention, it is possible to improve the attachment operability.

DESCRIPTION OF EMBODIMENTS

Hereinbelow, a first embodiment of the present disclosure will be described with reference to the drawings. Meanwhile, for the sake of convenience of description, the descriptions of the members having the same reference numerals as the members already described in the present embodiment are omitted. Also, for the sake of convenience of description, dimensions of the respective members shown in the drawings may be different from actual dimensions of the respective members.

Also, in the description of the present embodiment, for the sake of convenience of description, "the right and left direction", "the front and rear direction" and "the upper and lower direction" will be appropriately mentioned. The directions are relative directions set with respect to a vehicle V shown in FIG. 1. Here, "the upper and lower direction" is a direction including "the upward direction" and "the downward direction". "The front and rear direction" is a direction including "the forward direction" and "the rearward direction". "The right and left direction" is a direction including "the rightward direction" and "the leftward direction".

A vehicle cleaner unit of the present invention is applied as a unit configured to remove foreign matters such as water droplets, mud, grit and dust and the like attached to a vehicle-mounted sensor or the like (an example of a to-be-cleaned object) by using high-pressure air.

Figure 1:
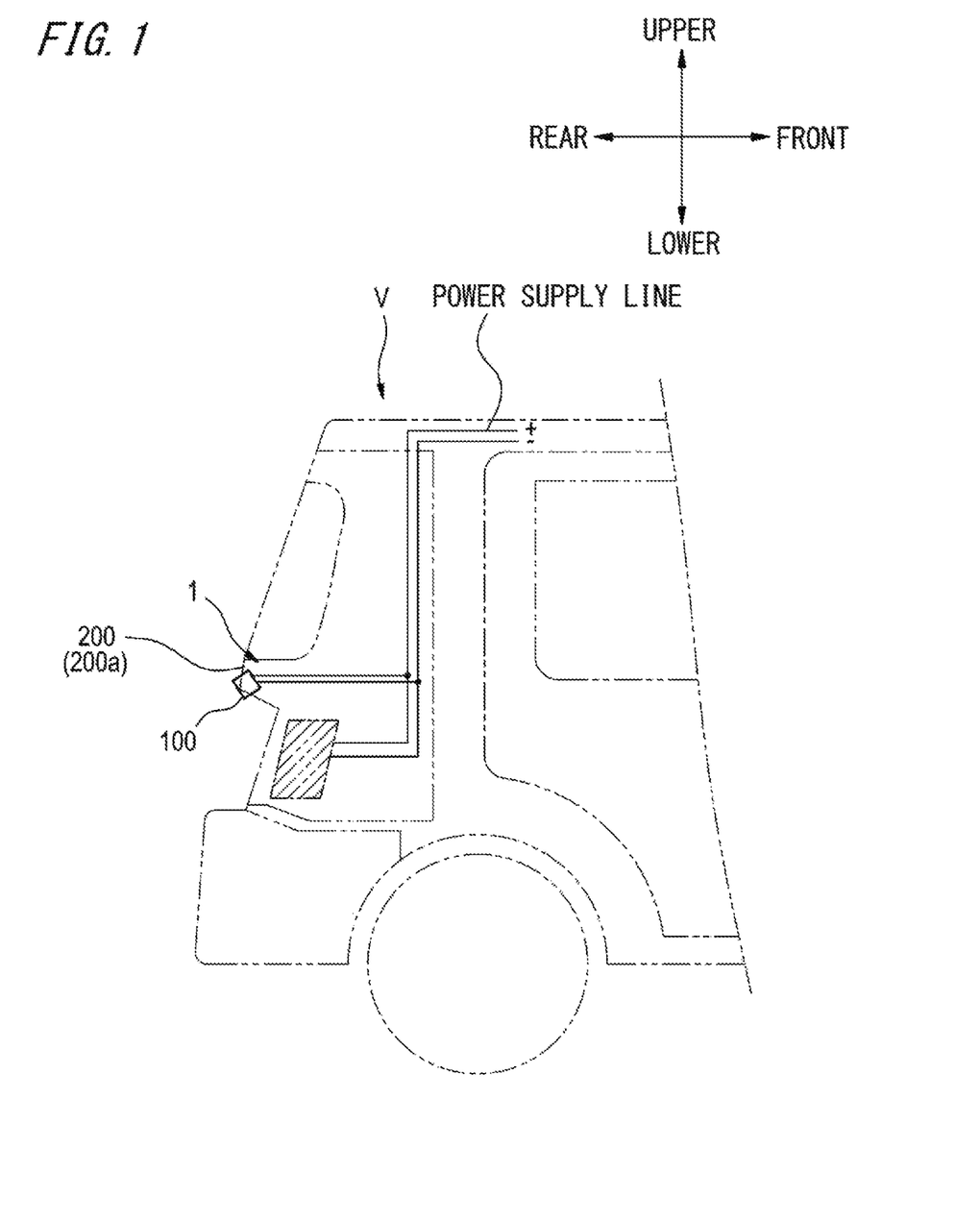
FIG. 1 is a side view of a rear part of a vehicle provided with a vehicle cleaner unit in accordance with an embodiment of the present invention.

FIG. 1 is a side view of a rear part of a vehicle provided with a vehicle cleaner unit. As shown in FIG. 1, a vehicle cleaner unit 1 is attached to a rear door 200 of the vehicle V, for example. Specifically, the vehicle cleaner unit is attached to a vehicle body panel 200a of the rear door 200, for example. The vehicle body panel 200a includes a body panel, a garnish, and the like. The vehicle cleaner unit 1 includes a drive unit, and a power supply terminal of the drive unit is connected to a power supply line of the vehicle V. In the meantime, the vehicle cleaner unit 1 may be attached to a rear bumper or the like of the vehicle V, for example.

As a vehicle-mounted sensor, which is a to-be-cleaned object, a vehicle-mounted camera 100 for checking the rear of the vehicle V may be exemplified. In the present embodiment, the vehicle-mounted camera 100 is attached to the vehicle cleaner unit 1 in a state in which a camera lens is exposed outside toward the rear of the vehicle V. In the meantime, the vehicle-mounted camera 100 may be attached to a front part, a side part or the like of the vehicle V, for example, without being limited to the rear part of the vehicle V.

Figure 2:
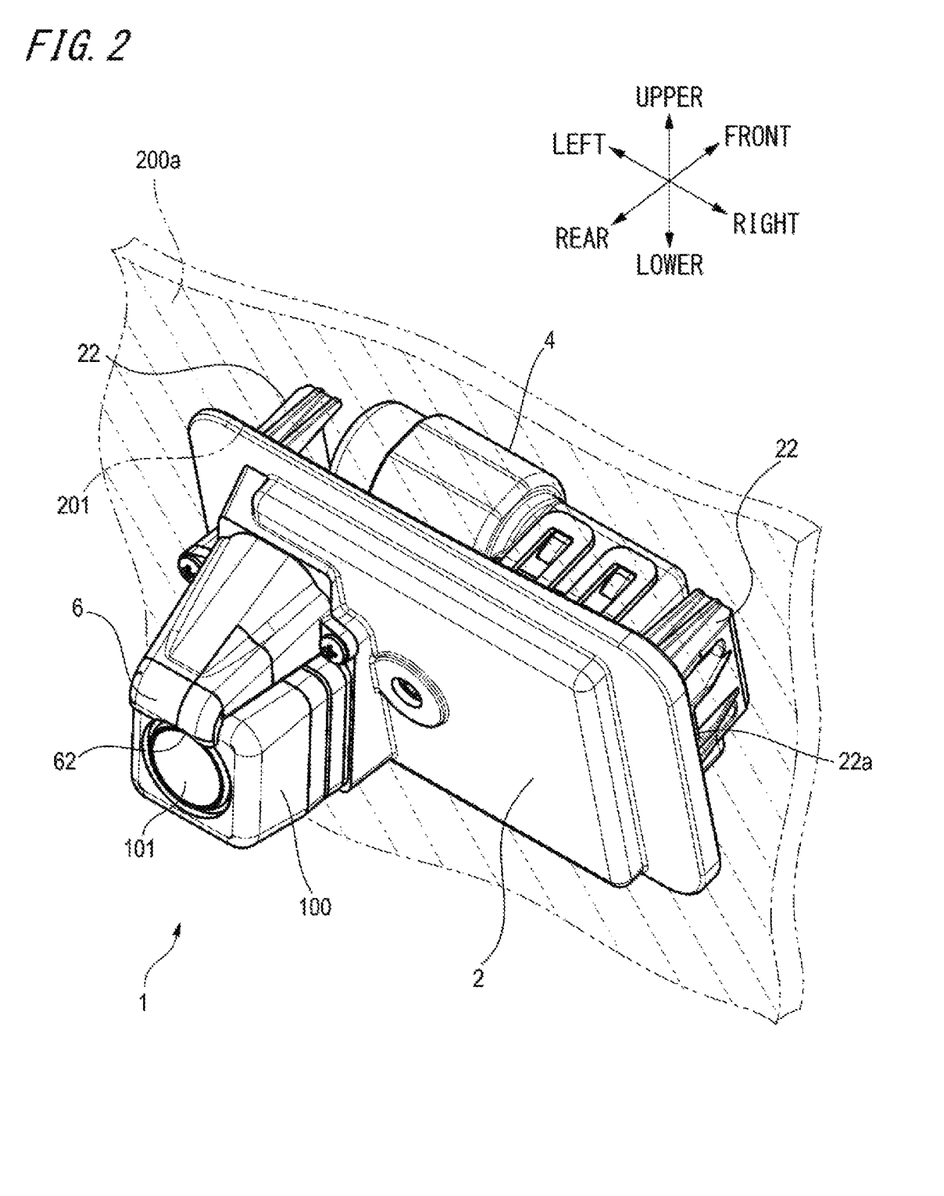
FIG. 2 is a front perspective view of the vehicle cleaner unit in accordance with the embodiment of the present invention.
Figure 3:
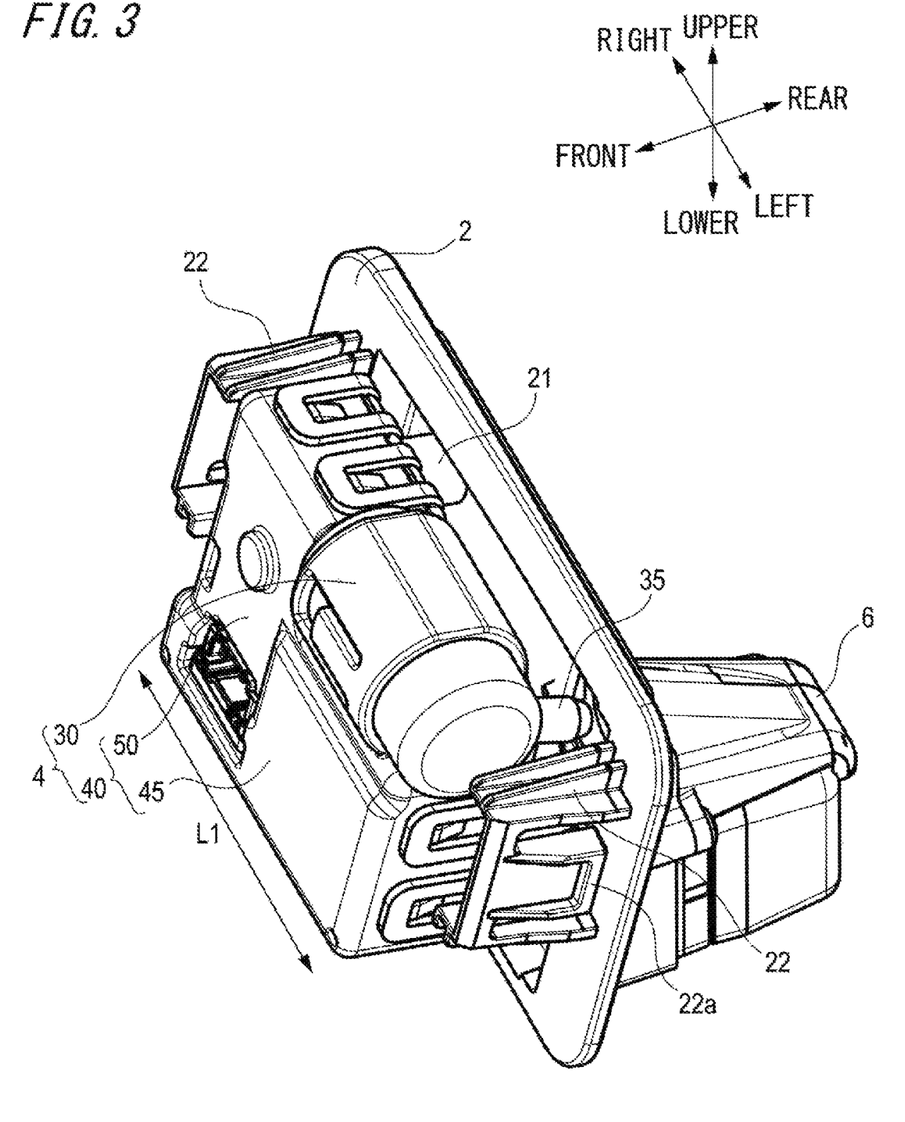
FIG. 3 is a rear perspective view of the vehicle cleaner unit shown in FIG. 2.
Figure 4:
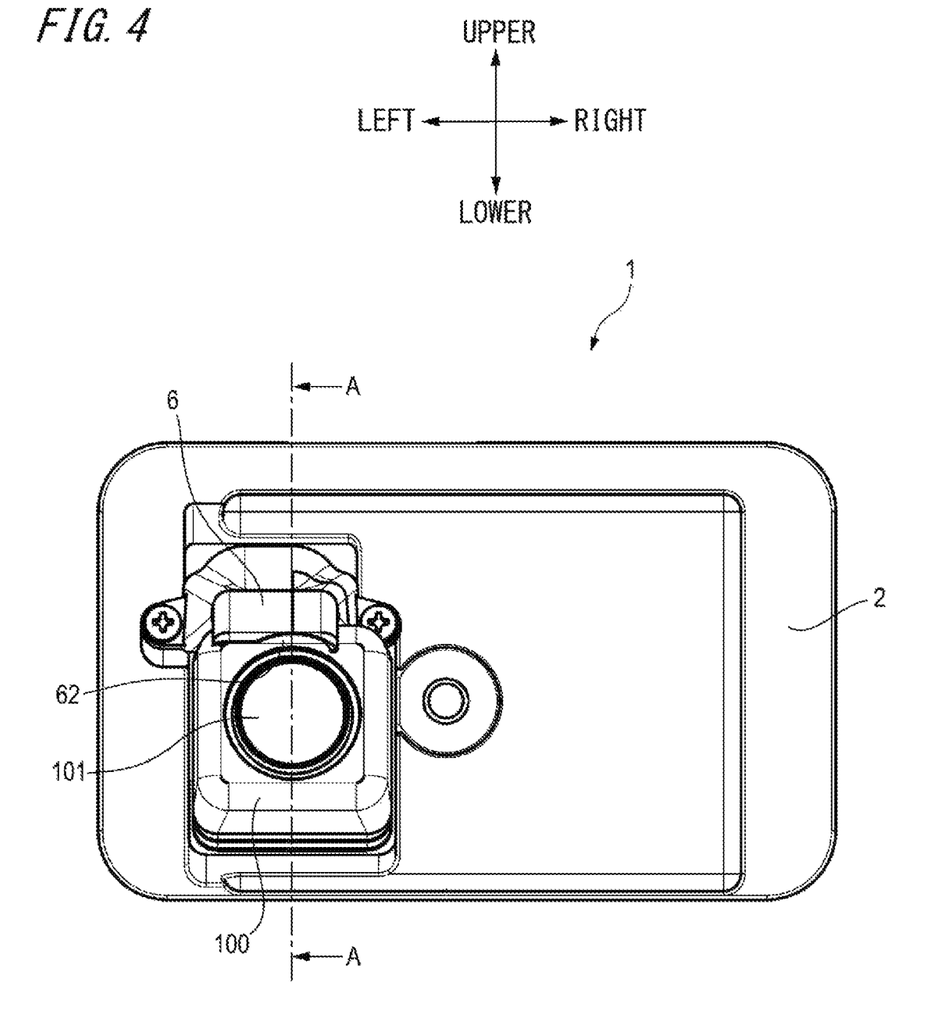
FIG. 4 is a front view of the vehicle cleaner unit shown in FIG. 2.
Figure 5:
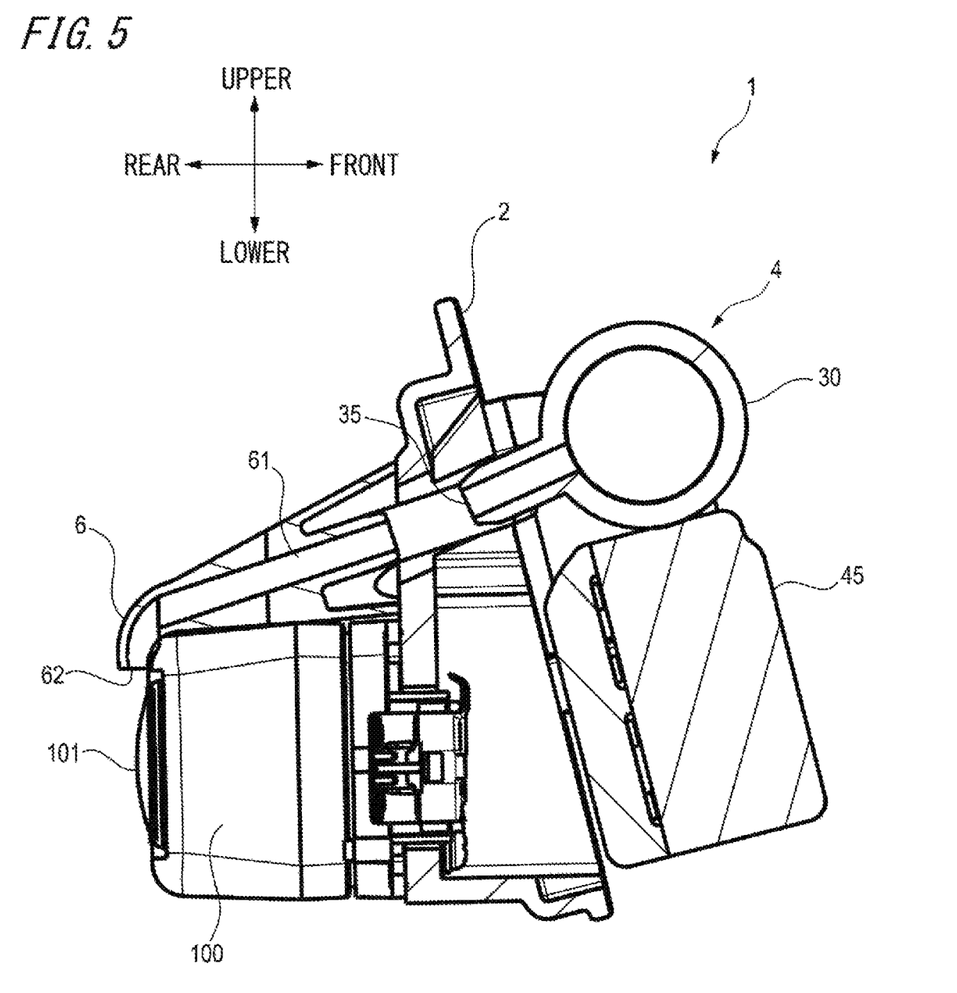
FIG. 5 is a sectional view taken along a line A-A of FIG. 4.

FIG. 2 is a perspective view depicting a state in which the vehicle cleaner unit 1 is attached to the vehicle body panel 200a of the rear door 200. FIG. 3 is a perspective view of the vehicle cleaner unit 1, as seen from the front of the vehicle. Also, FIG. 4 is a front view of the vehicle cleaner unit 1, and FIG. 5 is a sectional view taken along a line A-A of FIG. 4.

As shown in FIGS. 2 to 5, the vehicle cleaner unit 1 includes a base member 2 configured to support the vehicle-mounted camera 100, a high-pressure air generation unit 4 configured to generate high-pressure air, and a nozzle 6 configured to spray the generated high-pressure air toward the vehicle-mounted camera 100.

The base member 2 is a bracket for attaching the vehicle cleaner unit 1 to the vehicle body panel 200a, and has a substantially horn shape. A backside of the base member 2, which is a front side of the vehicle, is provided with the high-pressure air generation unit 4. The base member 2 is provided with a support part 21 for supporting the high-pressure air generation unit 4, and the high-pressure air generation unit 4 is detachably provided to the backside of the base member 2 via the support part 21. The high-pressure air generation unit 4 is mounted so that a longitudinal direction L1 is along a longitudinal direction (the right and left direction in FIG. 3) of the vehicle cleaner unit 1.

The high-pressure air generation unit 4 includes a pump 30 configured to generate high-pressure air by compressing air, and a drive source 40 configured to drive the pump 30. The drive source 40 includes a motor 45 configured to drive the pump 30 by rotary motion, and a worm mechanism 50 configured to transmit the rotary motion of the motor 45 to the pump 30. The high-pressure air generation unit 4 will be additionally described later with reference to FIGS. 6 to 8.

A front part of the base member 2, which is a rear side of the vehicle, is provided with the nozzle 6. The nozzle 6 is integrated with the base member 2 by integral molding or adhesion, for example. The nozzle 6 is positioned above the vehicle-mounted camera 100, and is provided so as to be exposed outside toward the rear of the vehicle V in parallel to the vehicle-mounted camera 100.

In the nozzle 6, a communication path 61 of the high-pressure air extending from the base member 2 toward the rear of the vehicle V along an upper surface of the vehicle-mounted camera 100 is provided. A tip end of the communication path 61 is provided with a discharge port 62 opening toward a camera lens 101 (an example of a cleaning surface) of the vehicle-mounted camera 100. When the high-pressure air generation unit 4 is attached to the base member 2 via the support part 21, an outlet 35 of the pump 30 through which the high-pressure air is to be ejected couples with the communication path 61 of the nozzle 6. Thereby, the high-pressure air blown out from the high-pressure air generation unit 4 is ejected outside of the vehicle cleaner unit 1 from the discharge port 62 of the nozzle 6 provided on a side of the base member 2, which is opposite to a side on which the high-pressure air generation unit 4 is provided.

Also, the backside of the base member 2 is provided with attachment arm parts 22 for attaching the vehicle cleaner unit 1 to the vehicle body panel 200a. The attachment arm part 22 is provided with a claw portion 22a. The claw portions 22a are engaged with an opening portion 201 formed in the vehicle body panel 200a, for example, so that the vehicle cleaner unit 1 is attached to the vehicle body panel 200a. The vehicle cleaner unit 1 is attached to the vehicle body panel 200a in a state in which the base member 2 is inserted in the opening portion 201 of the vehicle body panel 200a and the high-pressure air generation unit 4 attached to the base member 2 is disposed inside of the vehicle body panel 200a.

Figure 6:
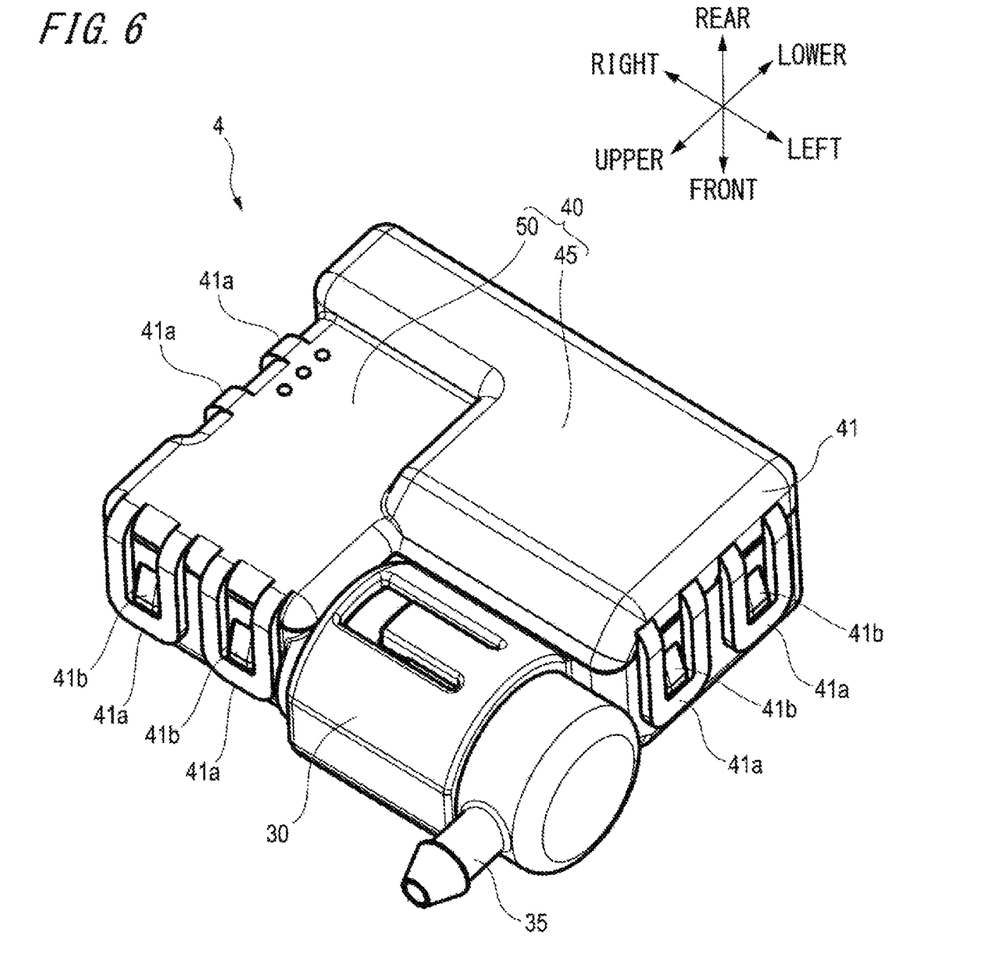
FIG. 6 is a perspective view depicting a high-pressure air generation unit of the vehicle cleaner unit.
Figure 7:
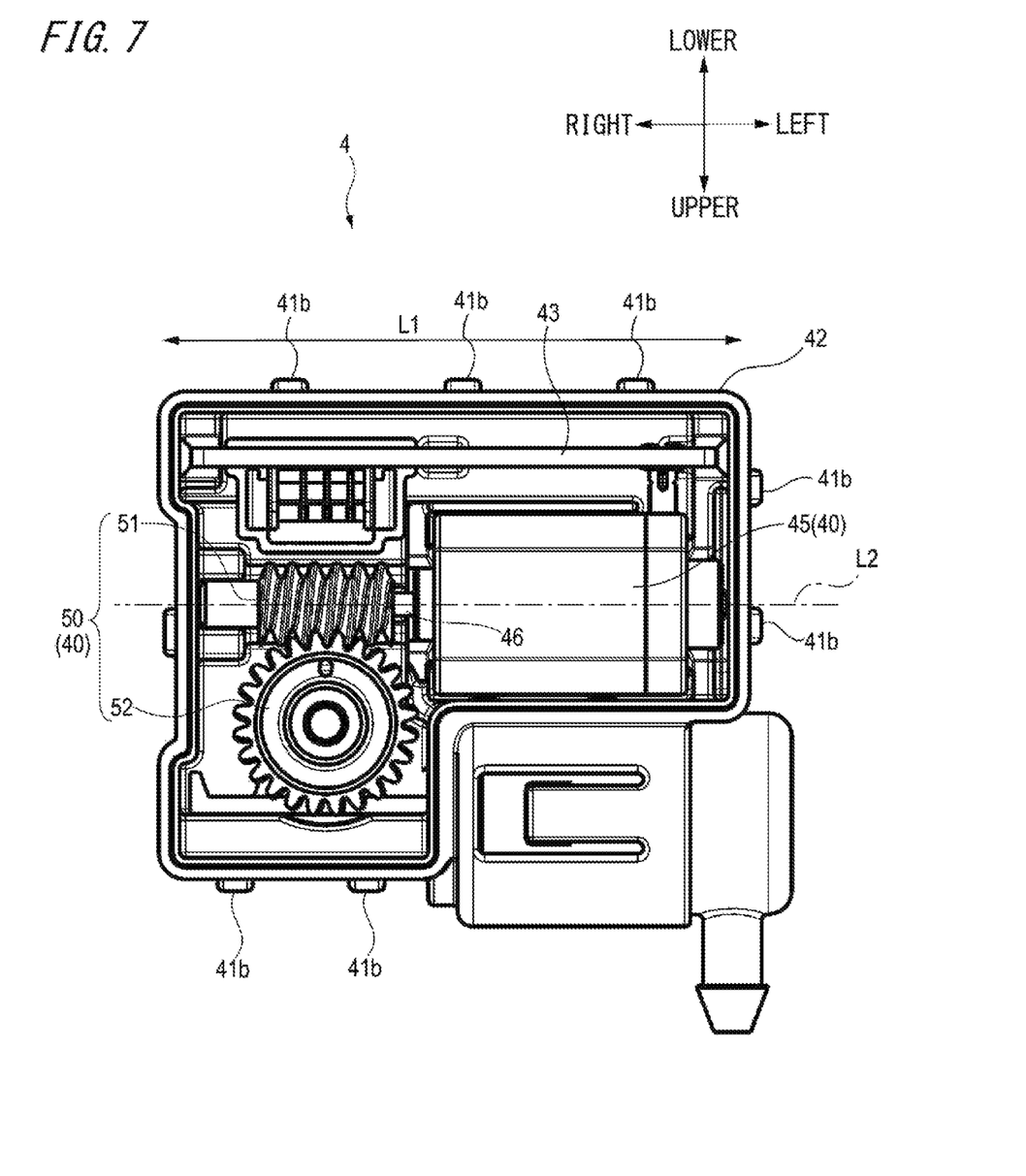
FIG. 7 depicts an inside of a drive source of the high-pressure air generation unit shown in FIG. 6.
Figure 8:
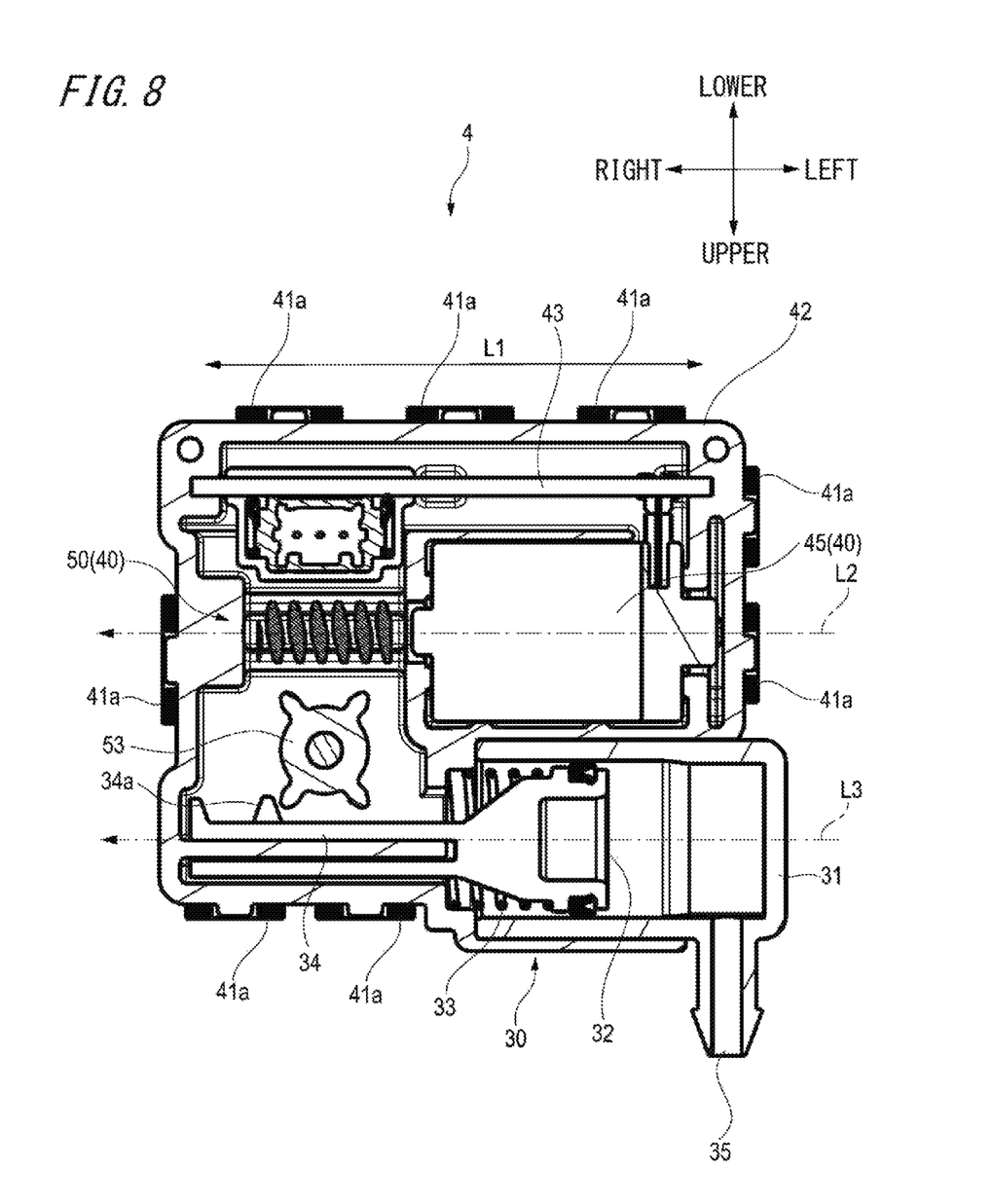
FIG. 8 is a sectional view of the high-pressure air generation unit shown in FIG. 6.

FIG. 6 is a perspective view of the high-pressure air generation unit 4. FIG. 7 depicts an internal configuration of the drive source 40. FIG. 8 is a sectional view along a longitudinal direction of the high-pressure air generation unit 4. In the meantime, a side (a cover part 41 side, which will be described later) of the high-pressure air generation unit 4 shown in FIG. 6, which is seen from a surface side of the drawing sheet, is a side to be attached to the base member 2. Also, in FIGS. 6 to 8, for descriptions, the outlet 35 of the pump 30 faces toward an upper side of the high-pressure air generation unit 4.

As shown in FIG. 6, the pump 30 and the drive source 40 (the motor 45 and the worm mechanism 50) configuring the high-pressure air generation unit 4 are integrally combined. A cover part 41 is detachably provided to the pump 30, the motor 45 and the worm mechanism 50. The cover part 41 is provided with a plurality of engaging arms 41a. An outer side of a housing 42 configured to accommodate the pump 30, the motor 45 and the worm mechanism 50 is provided with a plurality of claw portions 41b. The claw portions 41b are engaged with the respective engaging arms 41a of the cover part 41, so that the cover part 41 is attached to the pump 30, the motor 45 and the worm mechanism 50.

As shown in FIG. 7, the drive source 40 includes the single motor 45 and the single worm mechanism 50. The motor 45 is disposed so that a rotation axis L2 thereof is along the longitudinal direction L1 of the high-pressure air generation unit 4. The worm mechanism 50 includes a single worm 51 fixed to a rotary shaft 46 of the motor 45 and configured to rotate in conjunction with rotation of the motor 45, and a single worm wheel 52 in mesh with the worm 51 and configured to rotate in conjunction with rotation of the worm 51.

Also, as shown in FIG. 8, the worm mechanism 50 includes a piston 53 pivotally supported coaxially with the worm wheel 52 (refer to FIG. 7). The pinion 53 is configured to rotate together with the worm wheel 52.

As shown in FIG. 8, the pump 30 includes a cylinder 31 into which the air is to be introduced, a piston 32 configured to blow the air to an outside, an urging spring 33 (an example of an urging member) configured to urge the piston 32, a rack 34 extending continuously to the piston 32, and the outlet 35 from which the air is to be ejected.

The cylinder 31 is disposed so as to extend in the longitudinal direction L1 of the high-pressure air generation unit 4. The piston 32 is provided so as to carry out reciprocal linear motion in the longitudinal direction of the cylinder 31 inside of the cylinder 31. The urging spring 33 is provided so as to urge the piston 32 toward a first side in the longitudinal direction of the cylinder 31 inside of the cylinder 31. In the present embodiment, the first side means a direction (a leftward direction in FIG. 8) in which the piston 32 is to move when blowing the air in the cylinder 31 to the outside.

The piston 32 is moved toward the first side (a leftward direction in FIG. 8) as a result of urging of the urging spring 33, so that the air in the cylinder 31 is compressed and is ejected from the outlet 35 at high pressure. An end portion of the cylinder 31 at which the outlet 35 is provided is formed so as to be rotatable about a central axis L3 of the pump 30 and can change a direction of the outlet 35. On the other hand, the cylinder 31 may have a configuration in which the direction of the outlet 35 is fixed.

The rack 34 is formed integrally with the piston 32, and is provided along the longitudinal direction L1 of the high-pressure air generation unit 4 in a state in which it protrudes outward from the cylinder 31 having the piston 32 accommodated therein. The rack 34 is provided with rack teeth 34a. The rack 34 is caused to carry out reciprocal linear motion in the longitudinal direction of the cylinder 31, together with the piston 32.

The rack teeth 34a are configured to be in mesh with the pinion 53 of the worm mechanism 50. When the pinion 53 is rotated, the pinion 53 is meshed with the rack teeth 34a, thereby moving the rack 34 toward a second side in the longitudinal direction of the cylinder 31. In the present embodiment, the second side means a direction (a rightward direction in FIG. 8) that is opposite to the first side urged by the urging spring 33. That is, the second side is a direction opposite to a direction in which the piston 32 is to move when blowing the air in the cylinder 31 to the outside. When the rack 34 is moved toward the second side, the piston 32 carries out linear motion toward the second side together with the rack 34, against the urging of the urging spring 33.

Also, as shown in FIG. 8, in the housing 42 of the high-pressure air generation unit 4, a circuit board 43 for controlling an operation of the motor 45 is provided. The circuit board 43 is disposed along the longitudinal direction L1 of the high-pressure air generation unit 4 in parallel to the motor 45. The circuit board 43 is disposed so that the motor 45 is positioned between the circuit board 43 and the pump 30 (cylinder 31). The circuit board 43 is connected to a vehicle ECU (Electronic Control Unit) of the vehicle V, for example, and is configured to control the operation of the motor 45 by a signal from the vehicle ECU.

Like this, the pump 30 is disposed so that the central axis L3 is along the longitudinal direction L1 of the high-pressure air generation unit 4. That is, the motor 45 and the pump 30 of the high-pressure air generation unit 4 are disposed so that the rotation axis L2 of the motor 45 is substantially parallel to the central axis L3 of the pump 30. Also, the motor 45 and the pump 30 are disposed on the same side (a left side in FIGS. 7 and 8) of the worm mechanism 50 in the longitudinal direction L1 of the high-pressure air generation unit 4.

According to the vehicle cleaner unit 1 configured as described above and the vehicle V provided with the vehicle cleaner unit, the discharge port 62 of the nozzle 6 is provided on one side of the base member 2 and the high-pressure air generation unit 4 is provided on the opposite side to the side on which the discharge port 62 is provided, with the base member 2 being interposed therebetween. Thereby, it is possible to effectively configure a layout of the components of the vehicle cleaner unit 1, so that it is possible to implement the space saving.

Also, since the nozzle 6 is integrated with the base member 2, it is possible to omit an operation of attaching the nozzle 6 to the base member 2 during a manufacturing process, so that it is possible to improve the operation efficiency.

Also, the motor 45 and the pump 30 of the high-pressure air generation unit 4 are disposed in substantially parallel to each other so that the rotation axis L2 of the motor 45 and the central axis L3 of the pump 30 are along the longitudinal direction L1 of the high-pressure air generation unit 4. The motor 45 and the pump 30 are disposed on the same side of the worm mechanism 50 in the longitudinal direction L1 of the high-pressure air generation unit 4. For this reason, it is possible to efficiently configure the layout of the components of the high-pressure air generation unit 4, so that it is possible to implement the space saving.

Also, since the circuit board 43 for controlling the motor 45 is disposed inside of the housing 42 of the high-pressure air generation unit 4, it is possible to implement the further space saving.

In the meantime, the present invention is not limited to the embodiment and can be appropriately modified and improved. In addition, the materials, shapes, sizes, numerical values, forms, arrangement places and the like of the constitutional elements of the embodiment are arbitrary and are not particularly limited inasmuch as the present invention can be implemented.

The subject application is based on Japanese Patent Application Nos. 2017-165447 filed on Aug. 30, 2017 and 2017-165449 filed on Aug. 30, 2017, the contents of which are incorporated herein by reference.

The invention claimed is:

1. A vehicle cleaner unit for cleaning a to-be-cleaned object mounted on a vehicle, the vehicle cleaner unit comprising:
   a single motor;
   a single pump comprising a cylinder extending in a longitudinal direction of the vehicle cleaner unit, air being introduced into the cylinder, and a piston capable of carrying out linear motion in the longitudinal direction inside of the cylinder and configured to blow the air outside of the vehicle cleaner unit at high pressure;
   an urging spring configured to urge the piston toward a direction in which the piston is to move when blowing the air in the cylinder to the outside;
   a single worm mechanism configured to transmit rotary motion of the single motor to cause the piston to carry out linear motion toward a direction opposite the direction in which the piston is to move when blowing the air in the cylinder to the outside;
   a base member configured to support the to-be-cleaned object; and
   a nozzle configured to spray the high-pressure air toward a cleaning surface of the to-be-cleaned object,
   wherein a rotation axis of the single motor and the longitudinal direction are parallel to each other,
   wherein the single motor, the single pump, and the urging spring are positioned entirely on the same side of the worm mechanism in the longitudinal direction, and
   wherein a discharge port of the nozzle is provided on a face of the base member, which is opposite to a face of the base member on which the single pump and the single motor are provided, the base member being interposed therebetween.

2. The vehicle cleaner unit according to claim 1, wherein a circuit board for controlling the single motor is disposed inside of a housing of the vehicle cleaner unit.

3. The vehicle cleaner unit according to claim 2, wherein the circuit board is disposed in the longitudinal direction.

4. The vehicle cleaner unit according to claim 2, wherein the single motor is disposed between the circuit board and the cylinder.

5. The vehicle cleaner unit according to claim 1, wherein the nozzle is integrated with the base member.

6. A vehicle provided with a vehicle cleaner unit,
   the vehicle cleaner unit comprising:
   a single motor;
   a single pump comprising a cylinder extending in a longitudinal direction of the vehicle cleaner unit, air being introduced into the cylinder, and a piston capable of carrying out linear motion in the longitudinal direction inside of the cylinder and configured to blow the air outside of the vehicle cleaner unit at high pressure;
   an urging spring configured to urge the piston toward a direction in which the piston is to move when blowing the air in the cylinder to the outside;
   a single worm mechanism configured to transmit rotary motion of the single motor to cause the piston to carry out linear motion toward a direction opposite the direction in which the piston is to move when blowing the air in the cylinder to the outside;
   a base member configured to support the to-be-cleaned object; and
   a nozzle configured to spray the high-pressure air toward a cleaning surface of the to-be-cleaned object,
   wherein a rotation axis of the single motor and the longitudinal direction are parallel to each other,
   wherein the single motor, the single pump, and the urging spring are positioned entirely on the same side of the worm mechanism in the longitudinal direction, and
   wherein a discharge port of the nozzle is provided on a face of the base member, which is opposite to a face of the base member on which the single pump and the single motor are provided, the base member being interposed therebetween.

7. The vehicle cleaner unit according to claim 1, wherein an end portion of the cylinder is configured to be rotatable around a central axis of the single pump.

8. The vehicle cleaner unit according to claim 1, wherein the base member supports the to-be-cleaned object on the first face of the base member that is opposite to the second face of the base member on which the single pump and the single motor are provided.

* * * * *